United States Patent [19]
Schick

[11] Patent Number: 5,644,836
[45] Date of Patent: Jul. 8, 1997

[54] DEVICE FOR BELT CONNECTORS

[75] Inventor: Jean-François Schick, Monteferrier/Lez, France

[73] Assignee: Goro S.A., Saint Privat des Vieux, France

[21] Appl. No.: 498,463

[22] Filed: Jul. 5, 1995

[30] Foreign Application Priority Data

Jul. 11, 1994 [DE] Germany ............... 44 24 041.4

[51] Int. Cl.$^6$ ............................. B23P 11/00
[52] U.S. Cl. .................. 29/798; 29/243.51; 227/153; 227/155
[58] Field of Search ............... 29/798, 243.51; 227/143, 144, 147, 153, 155

[56] References Cited

U.S. PATENT DOCUMENTS

| | | | |
|---|---|---|---|
| 3,142,842 | 8/1964 | Neale | 227/143 |
| 4,144,628 | 3/1979 | Schick | 29/243.51 |
| 4,522,329 | 6/1985 | Stolz | 29/243.51 |
| 5,368,214 | 11/1994 | Schick | 29/243.51 |

FOREIGN PATENT DOCUMENTS

| 2202605 | 9/1988 | United Kingdom | 29/243.51 |
|---|---|---|---|

Primary Examiner—David P. Bryant
Attorney, Agent, or Firm—Herbert Dubno; Andrew Wilford

[57] ABSTRACT

An apparatus for securing a U-shaped clip to the end of a belt with a staple has a die having a seat shaped to fit a belt end over which is fitted the clip, a presser head displaceable transversely toward and away from the die and having a passage holding the staple, and a plunger displaceable toward and away from the die in the passage of the presser head. Respective piston-cylinder units connected to the presser head and plunger and are pressurizable to displace same toward the die. A hydraulic pump supplies fluid under pressure to a multiport valve connected to the piston-cylinder units for first pressurizing the presser unit to compress the clip on the belt end and then for pressurizing the plunger unit for forcing the staple through the belt end and clip.

11 Claims, 4 Drawing Sheets

DEVICE FOR BELT CONNECTORS

DESCRIPTION

1. Field of The Invention

The invention refers to a fastening device for belt connectors consisting of a number of connecting clips arranged in rows on conveyor belt ends, the device including at least one bending die to position the connecting clips and a pressure head to be lowered against the bending die for pressing U-shaped connecting clips against the inserted belt including a penetrating die for fastening staples which can be inserted by means of the penetrating die into the U-shaped legs of the connecting clips, penetrating the belt end. For the purpose of this invention the connecting clips may also be other fastening devices such as rivets or similar.

2. Background of The Invention

A similar fastening device is known from commonly owned U.S. Pat. No. 5,368,214, in which a penetrating die is pressurised manually by a fitter by means of a chop hammer. Such manual insertion of fastening staples is often inadequate due to the hammering force being irregular. If the hammering force is excessive, there is a risk that the fastening staples are inserted too deeply into the belt ends, damaging the fastening clips and/or their legs or even fracturing them. Another problem may be seen in the fact that the pressure head could pop up under excessive hammering of the penetrating die due to bouncing back, causing projection of the fastening staples, to be hammered in, from the belt ends, being neither hammered in accurately enough nor penetrating the belt ends to a sufficient depth. Moreover, even damage of the pressure head cannot be excluded as the hammer will not always be driven exactly vertically unto the penetrating die but may hit it obliquely, hitting the pressure head at the same time.

OBJECT OF THE INVENTION

The invention is based on the task of designing a fastening device for belt connectors consisting of a number of connecting clips arranged in rows on conveyor belt ends of the embodiment described above, ensuring exact penetration of the fastening staples without damaging the connecting clips and the fastening staples themselves in an aligned position and the connecting clips in a simple, fast and efficient way.

SUMMARY OF THE INVENTION

This task is solved by the invention by a generic fastening device in that the pressure head and the penetrating die are each driven by a cylinder piston arrangement and that these cylinder piston arrangements are alternatively pressurised (from a hydraulic pump) by hydraulic fluid to which a multiport valve is connected. According to the teaching of this invention, therefore a hydraulic drive is realised for the pressure head and the penetrating die. Measures taken by the invention ensure that the pressure head will on the one hand compress the connecting clips always with the specified die pressure acting on each inserted belt end and that on the other hand, the fastening clips are in the same way always pressurised by a specified die pressure during penetration, therefore eliminating damage to the connecting clips and fastening staples. The adjustable die pressure required for pressing the connecting clips down and for penetration by the fastening staples is generated by a driven hydraulic pump connected to cylinder piston arrangements. In fact, the stroke of the pressure head and penetrating die and their pressure can be accurately adjusted to ensure that the correct compression of the connecting clips on each belt end and the required penetration depth of the fastening staples can always be achieved dependent on the thickness and quality of a belt. Overall, the belt connectors and/or the connecting clips can be fastened easily, fast and therefore very efficiently to the belt ends by a fastening device according to the invention.

Other measures vital to the invention will be described in the following. The cylinder piston arrangements, for instance, may be designed as double-acting cylinder piston arrangements or single-acting cylinder piston arrangements, with each including a return spring. Furthermore, the cylinder piston arrangements may be arranged next to each other or concentrically. Based on a modified embodiment of the invention, which is of independent significance, only one cylinder piston arrangement will be included, having two telescopic pistons, with one piston driving the pressure head and the other the penetrating die, with both pistons being pressurised separately and selectively by hydraulic fluid. For practical purposes the hydraulic tubing system between the multiport valve and the cylinder piston arrangements connected to a collecting tank each include, a relief valve. This will eliminate exceeding the set die forces and/or pressures. The collecting tank(s)—each branch line may be connected to its own collecting tank— is preferably connected to a hydraulic accumulator more or less acting as the main tank, connected by an inlet tube to the hydraulic pump, therefore supplying the hydraulic pump, thus realising a fully closed hydraulic circuit. The multiport valve will ensure that the cylinder piston arrangements for the pressure head on the one side and the penetrating die on the other will always be pressurised by hydraulic fluid in the correct sequence, as the multiport valve will be actuated by an electro-magnetic pilot stage or by being pressurised. The hydraulic pump may be designed as a bi-directional centrifugal or displacement pump, such as a piston pump, including a manually operated On/Off switch. For the purpose of the invention the storage tanks, the hydraulic pump, the multiport valve, the relief valve and the cylinder piston arrangements may be combined to form one hydraulic drive unit, at the same time forming the head of the press for the pressure head and the penetrating die.

BRIEF DESCRIPTION OF THE DRAWING

In the following the invention will be described by only one drawing showing an embodiment of the invention, where.

SPECIFIC DESCRIPTION

Figure 1:
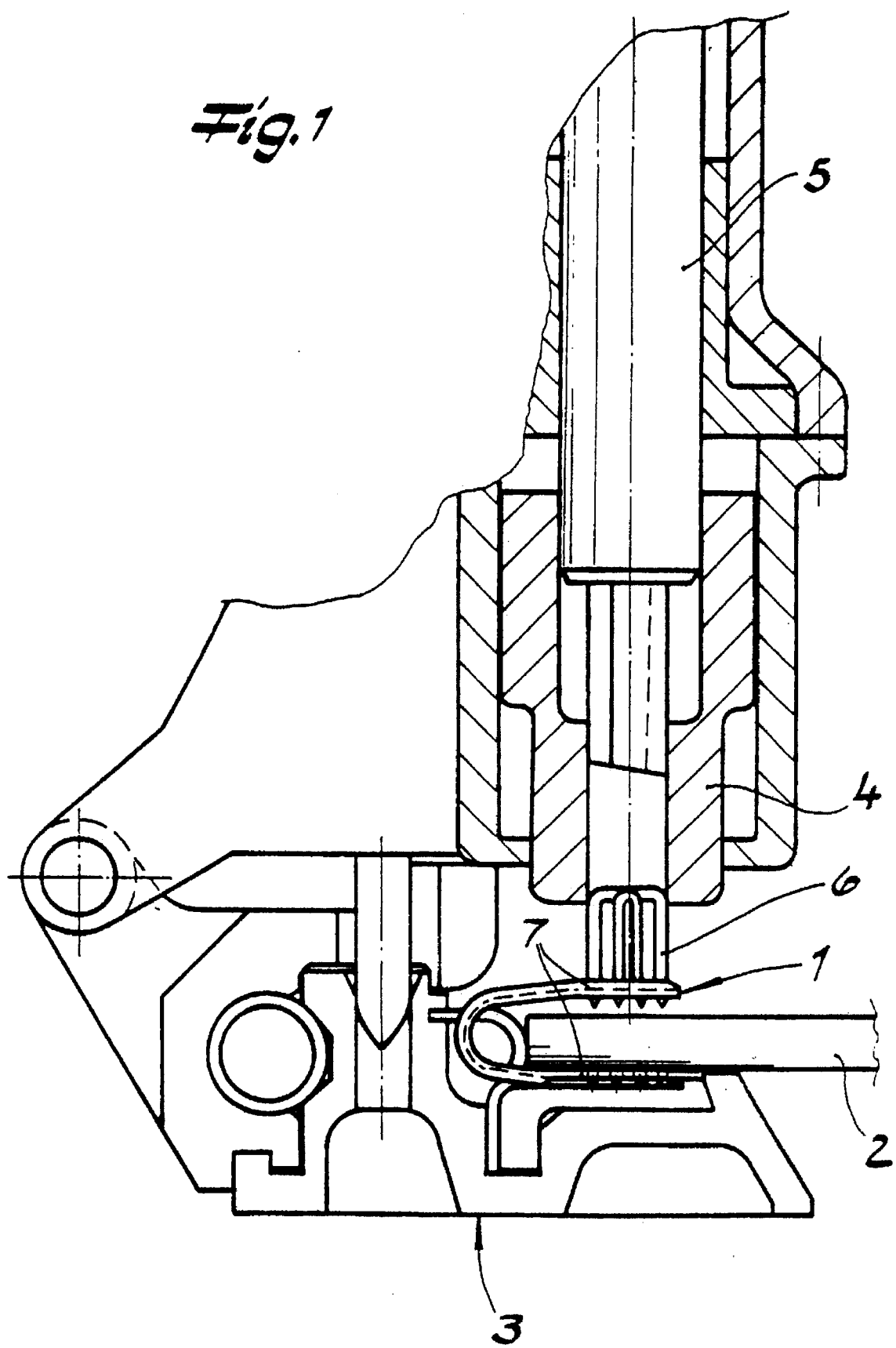
FIG. 1 is a partial vertical section of the fastening device of the invention in its starting position.
Figure 2:
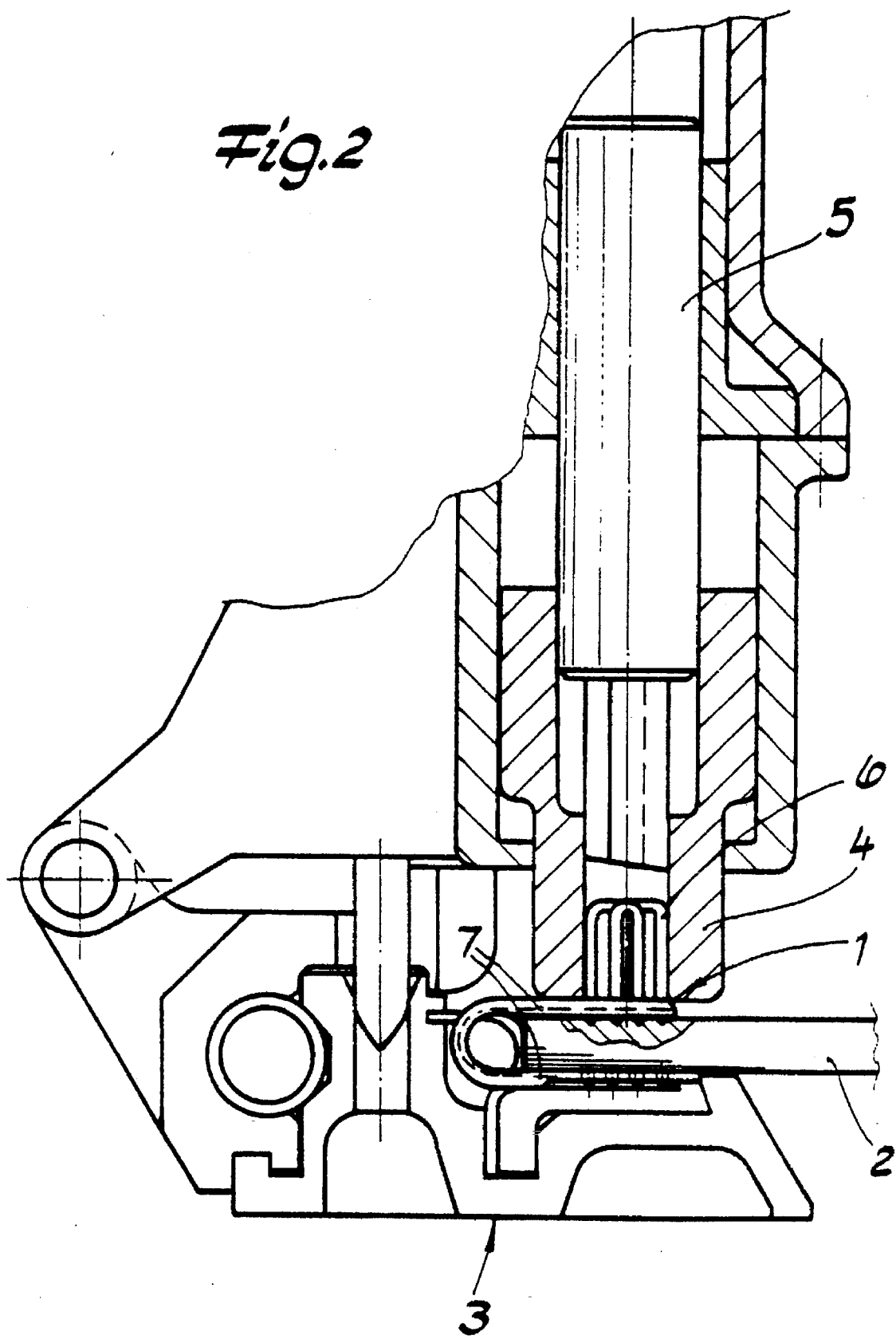
FIG. 2 is the object of FIG. 1 after lowering of the pressure head.
Figure 3:
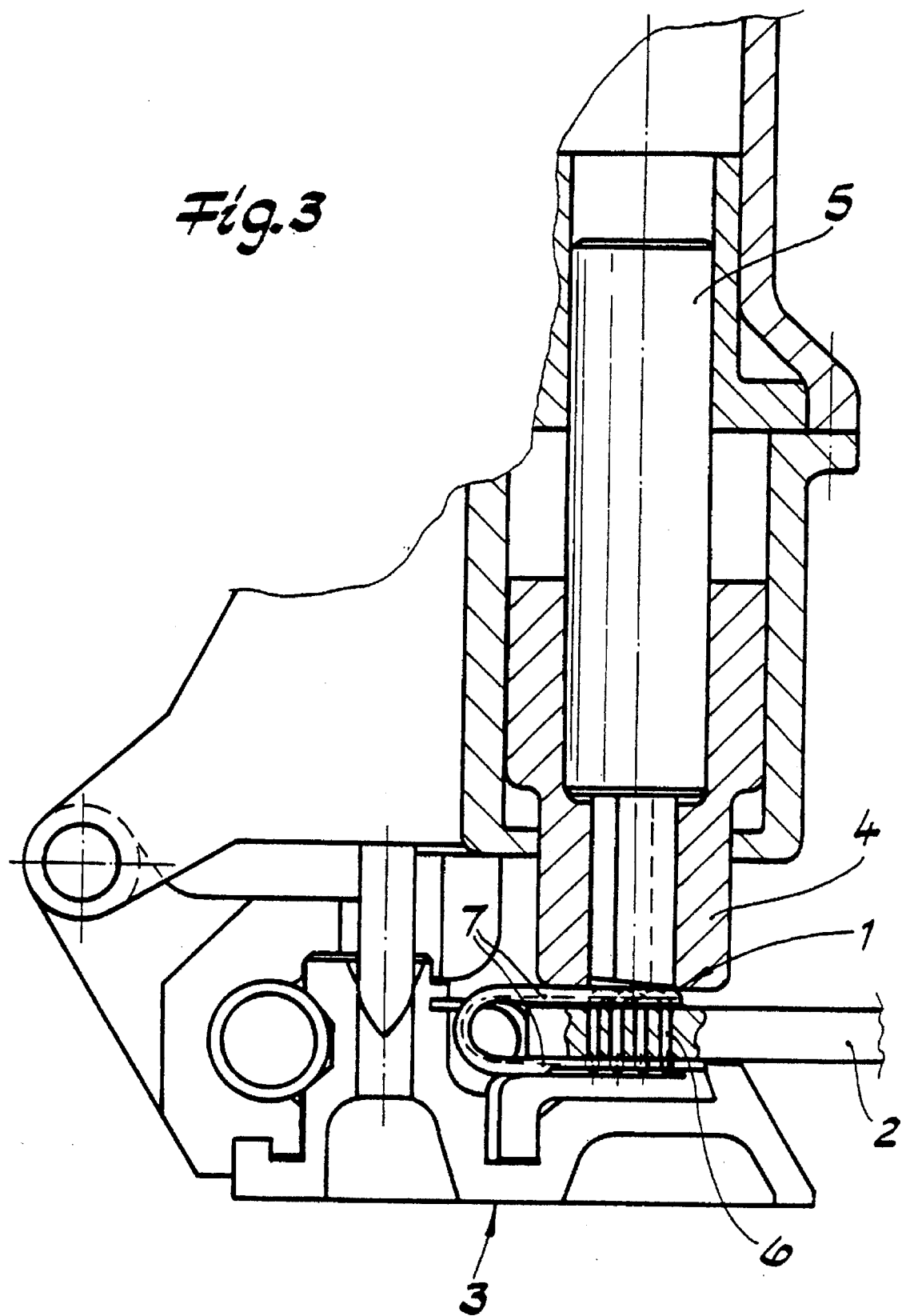
FIG. 3 is the object of FIG. 2 after lowering of the penetrating die and FIG. 4 is a schematic diagram of the hydraulic circuit to activate the pressure head and the penetrating die, similar to the head of the press.
Figure 4:
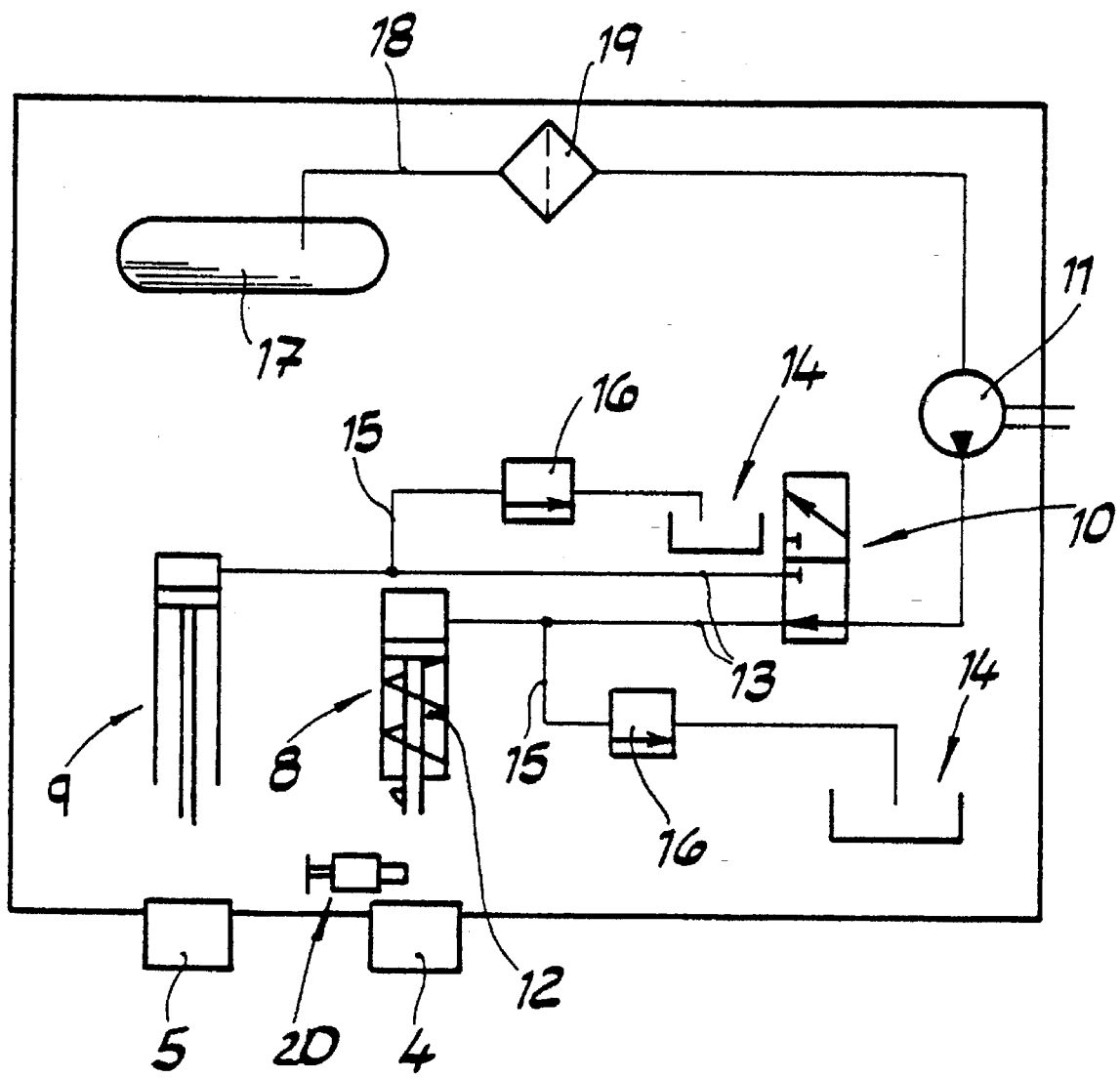

The figures show a fastening device for belt connectors consisting of a series of connecting clips 1 arranged on conveyor belt ends 2. The basic design of this device includes at least one bending die 3 for positioning the fastening clips 1 and a pressure head 4 to be lowered against a bending die 3 to compress the U-shaped connecting clips 1 against an inserted belt end 2 and including a lowering penetrating die 5 for fastening staples 6 which can be inserted by means of the penetrating die 5 through U-legs 7 of connecting clips 1, penetrating the belt end 2 inserted between the connecting clips 1. The pressure head 4 and the penetrating die 5 are each driven by a cylinder piston arrangement 8, 9. The cylinder piston arrangements 8, 9 are alternatively pressurised by a hydraulic fluid in a set sequence by means of a hydraulic pump 11 connected to a multivalve 10. Cylinder piston arrangements 8, 9 may be designed as double-acting piston arrangements or single-acting cylinder piston arrangements including a return spring 12 (see FIG. 4). The hydraulic tubing 13 connected between the multiport valve 10 and the cylinder piston arrangements 8,9 is connected to branch lines 15 each connected to a collecting tank 14, including a relief valve 16. The collecting tanks 14 are connected to a hydraulic accumulator 17, in turn connected to the hydraulic pump 11 by an inlet tube 18. This inlet tube 18 includes a filter 19, resulting in a fully closed hydraulic circuit. The multiport valve 10, based on the example of an embodiment of the invention, is activated by pressurisation. The hydraulic accumulator 7 and the collecting tank 14, the filter 19, the hydraulic pump 11, the multiport valve 10, the cylinder piston arrangements 8, 9 and the relief valve 16 and associated hydraulic tubing are more or less forming a head of the press for the pressure head 4 on the one hand and the penetrating die 5 on the other. In addition, there is a sketched On/Off switch 20.

The fastening device according to the invention is operated as follows: After positioning of the connecting clips 1 and inserting of the appropriate belt end 2, the hydraulic pump 11 will be activated, supplying initially the cylinder piston arrangement 8 allocated to the pressure head 4 through the multiport valve 10. This cylinder piston head 8 will lower the pressure head 4, compressing the connecting clips 1 against the belt end 2. This is followed by change-over of the multi-way valve 10, followed by pressurizing the cylinder piston arrangement 9 allocated to the penetrating die 5 by hydraulic fluid, lowering the penetrating die 5 which will insert the fastening staples 6 through the U-shaped leg 7 of the connecting clips 1, penetrating the belt end 2. Subsequently both the pressure head 4 and the penetrating die 5 are returned to their original positions. In single-acting cylinder piston arrangements 8, 9, this is performed by means of a relief valve and return springs. In case of double-acting cylinder piston arrangements this is effected by means of reversed pressurisation by hydraulic fluid. Subsequently a new cycle may be performed.

I claim:

1. In combination with a U-shaped clip and a staple, a stapling apparatus comprising:

a die having a seat shaped to fit a belt end over which is fitted the clip;

a presser head displaceable transversely toward and away from the die and having a passage holding the staple;

a first piston-cylinder unit operatively connected to the presser head and pressurizable to displace the presser head toward the die;

a plunger displaceable toward and away from the die in the passage of the presser head;

a second piston-cylinder unit operatively connected to the plunger and pressurizable to displace the plunger toward the die;

means including a hydraulic pump for supplying fluid under pressure; and control means including a multiport valve between the pump and the piston-cylinder units for first pressurizing the first piston-cylinder unit to cause the presser head to compress the clip on the belt end and then for pressurizing the second piston-cylinder unit to cause the plunger to force the staple through the belt end and clip.

2. The stapling apparatus defined in claim 1 wherein the piston-cylinder units are double-acting.

3. The stapling apparatus defined in claim 1 wherein the piston-cylinder units are single-acting and each have a return spring.

4. The stapling apparatus defined in claim 1 wherein the piston-cylinder units are generally concentric.

5. The stapling apparatus defined in claim 1 wherein one of the piston-cylinder units has a piston and the other piston-cylinder unit has a piston telescoped inside the piston of the one piston-cylinder unit.

6. The stapling apparatus defined in claim 1 wherein the supply means further includes respective hydraulic lines interconnecting the multiport valve and piston-cylinder units;

respective branch lines including pressure-relief valves connected to the hydraulic lines.

7. The stapling apparatus defined in claim 6 wherein the supply means further includes a hydraulic accumulator connected to the hydraulic lines, the pump having an intake connected to the accumulator and an output connected to the multiport valve.

8. The stapling apparatus defined in claim 1 wherein the multiport valve is electromagnetically actuated.

9. The stapling apparatus defined in claim 1 wherein the multiport valve is actuated by fluid pressure.

10. The stapling apparatus defined in claim 1 wherein the supply means includes another hydraulic pump.

11. The stapling apparatus defined in claim 10 wherein the other pump is a piston pump.

* * * * *